US011214093B2

(12) United States Patent
Murai

(10) Patent No.: US 11,214,093 B2
(45) Date of Patent: Jan. 4, 2022

(54) OMNIDIRECTIONAL WHEEL

(71) Applicant: KABUSHIKI KAISHA TOYOTA JIDOSHOKKI, Kariya (JP)

(72) Inventor: Makoto Murai, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 244 days.

(21) Appl. No.: 16/545,812

(22) Filed: Aug. 20, 2019

(65) Prior Publication Data

US 2020/0062031 A1 Feb. 27, 2020

(30) Foreign Application Priority Data

Aug. 27, 2018 (JP) .............................. JP2018-158377

(51) Int. Cl.
*B60B 19/00* (2006.01)
*B60B 19/12* (2006.01)

(52) U.S. Cl.
CPC .......... *B60B 19/003* (2013.01); *B60B 19/125* (2013.01)

(58) Field of Classification Search
CPC ............................ B60B 19/003; B60B 19/125
See application file for complete search history.

(56) References Cited

U.S. PATENT DOCUMENTS

| 9,365,076 B2* | 6/2016 | Bando ..................... B60B 19/12 |
| 2014/0232174 A1 | 8/2014 | Zdrahal et al. |
| 2015/0130260 A1 | 5/2015 | Bando et al. |
| 2020/0147998 A1* | 5/2020 | Choi ....................... B60B 19/12 |

FOREIGN PATENT DOCUMENTS

| JP | 3421290 B2 | 4/2003 |
| JP | 2014-526419 A | 10/2014 |
| JP | 2015-093513 A | 5/2015 |

* cited by examiner

*Primary Examiner* — Jason R Bellinger
(74) *Attorney, Agent, or Firm* — Sughrue Mion, PLLC

(57) ABSTRACT

An omnidirectional wheel includes a plurality of first and second rollers, a plurality of roller support parts, a wheel hub, and a fixing member. The wheel hub has a shaft portion and an extension. The fixing member and an elastic body are disposed to surround the shaft portion. Spaces are provided between the elastic body and the shaft portion, or between the elastic body and the roller support parts. A plurality of first pins and second pins are formed to protrude from the extension and the fixing member, respectively. The elastic body has a plurality of first holes and second holes. The first holes and the second holes are shifted from each other in a circumferential direction of the elastic body.

5 Claims, 5 Drawing Sheets

OMNIDIRECTIONAL WHEEL

CROSS-REFERENCE TO RELATED APPLICATION

This application claims priority to Japanese Patent Application No. 2018-158377 filed on Aug. 27, 2018, the entire disclosure of which is incorporated herein by reference.

BACKGROUND ART

The present disclosure relates to an omnidirectional wheel.

An omnidirectional wheel is generally configured by assembling a plurality of rollers. In the omnidirectional wheel, when a point of contact with the ground moves from one roller to another roller during traveling, an impact is generated to make a noise. To solve this problem, an omnidirectional wheel configured to absorb the impact has been proposed.

Japanese Patent Application Publication No. 2015-93513 discloses such an omnidirectional wheel. The omnidirectional wheel described in the Publication includes a wheel hub rotatably disposed around an axle shaft, a roller assembly located radially outward and distanced from the wheel hub, a plurality of rollers free-rotatably supported by the roller assembly, and two circular rubber tubes radially interposed between the wheel hub and the roller assembly. The roller assembly includes first support members each attaching a pair of large diameter rollers to plate-like members, and second support members each attaching a pair of small diameter rollers to the plate-like members. The first support members and the second support members are alternately arranged in an annular shape. The rubber tubes are interposed between the outer circumferential surface of the wheel hub and the inner circumferential surface of the annular shape formed of the first support members and the second support members in contact therebetween in a radial direction.

However, the conventional technique described above has the following problem. The rubber tubes (elastic bodies) are merely in contact with the wheel hub and the support members (roller support parts), so that a torque of the wheel hub is transmitted to the roller support parts by friction at the contact portions of the elastic bodies with the wheel hub and the roller support parts. In this case, the elastic bodies may slip at the contact portions of the elastic bodies with the wheel hub and the roller support parts (friction contact portions) by a large driven torque applied to the wheel hub. For example, traveling of a vehicle is controlled with the number of rotations of the omnidirectional wheels, the slipping at the friction contact portions causes phase shifts between the elastic bodies and the wheel hub, or between the elastic bodies and the roller support parts, with the result that a vehicle controllability such as stopping accuracy and straight-line stability becomes lower.

The present disclosure has been made in view of the above circumstances and is directed to providing an omnidirectional wheel absorbing an impact generated during traveling while preventing a slipping at contact portions of elastic bodies with a wheel hub and roller support parts.

SUMMARY

In accordance with an aspect of the present disclosure, there is provided an omnidirectional wheel rotationally driven by a driving source that includes a plurality of first and second rollers arranged in an annular shape, a plurality of roller support parts free-rotatably supporting the first and second rollers, a wheel hub disposed radially inward from the roller support parts, and a fixing member fastened to the roller support parts. The wheel hub has a shaft portion connected to the driving source and an extension formed to extend from an outer circumferential surface of the shaft portion. The fixing member is disposed to surround the shaft portion. An elastic body is disposed between the extension and the fixing member to surround the shaft portion. A space is provided between the elastic body and the shaft portion. A space is provided between the elastic body and the roller support parts. A plurality of first pins are formed to protrude from the extension. A plurality of second pins are formed to protrude from the fixing member. The elastic body has a plurality of first holes into which the first pins are fitted, and a plurality of second holes into which the second pins are fitted. The first holes and second holes are shifted from each other in a circumferential direction of the elastic body.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an embodiment of the present disclosure with reference to the accompanying drawings.

Figure 1:
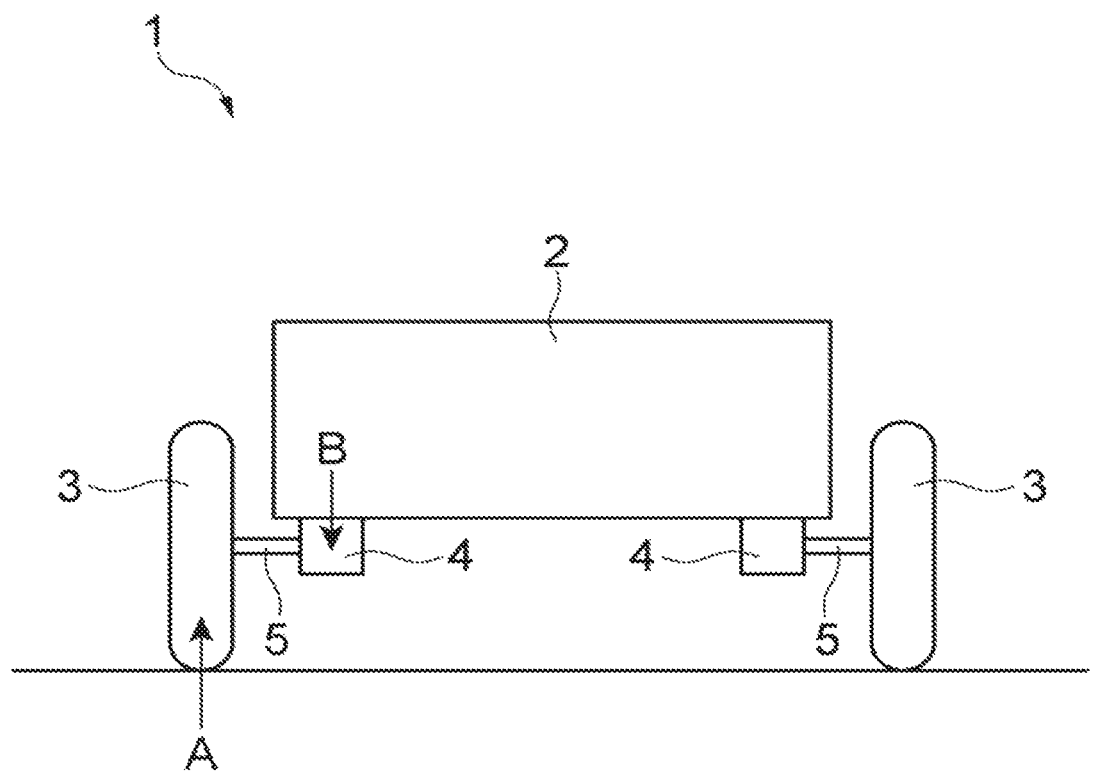
FIG. 1 is a schematic view of a vehicle unit including omnidirectional wheels according to an embodiment of the present disclosure.

FIG. 1 is a schematic view of a vehicle unit including omnidirectional wheels according to an embodiment of the present disclosure. In FIG. 1, a vehicle unit 1 is, for example, a mobile cart, an autonomous robot, or the like. The vehicle unit 1 includes a vehicle body 2 and four omnidirectional wheels 3, namely, a front-left wheel 3, a front-right wheel 3, a rear-left wheel 3, and a rear-right wheel 3 (only two omnidirectional wheels 3 are illustrated in FIG. 1). The omnidirectional wheels 3 are generally called omni-wheels, Each omnidirectional wheel 3 is rotationally driven by a drive motor 4 corresponding to a driving source mounted on a lower part of the vehicle body 2. An axle shaft 5 is fixed to an output shaft of the drive motor 4.

Figure 2:
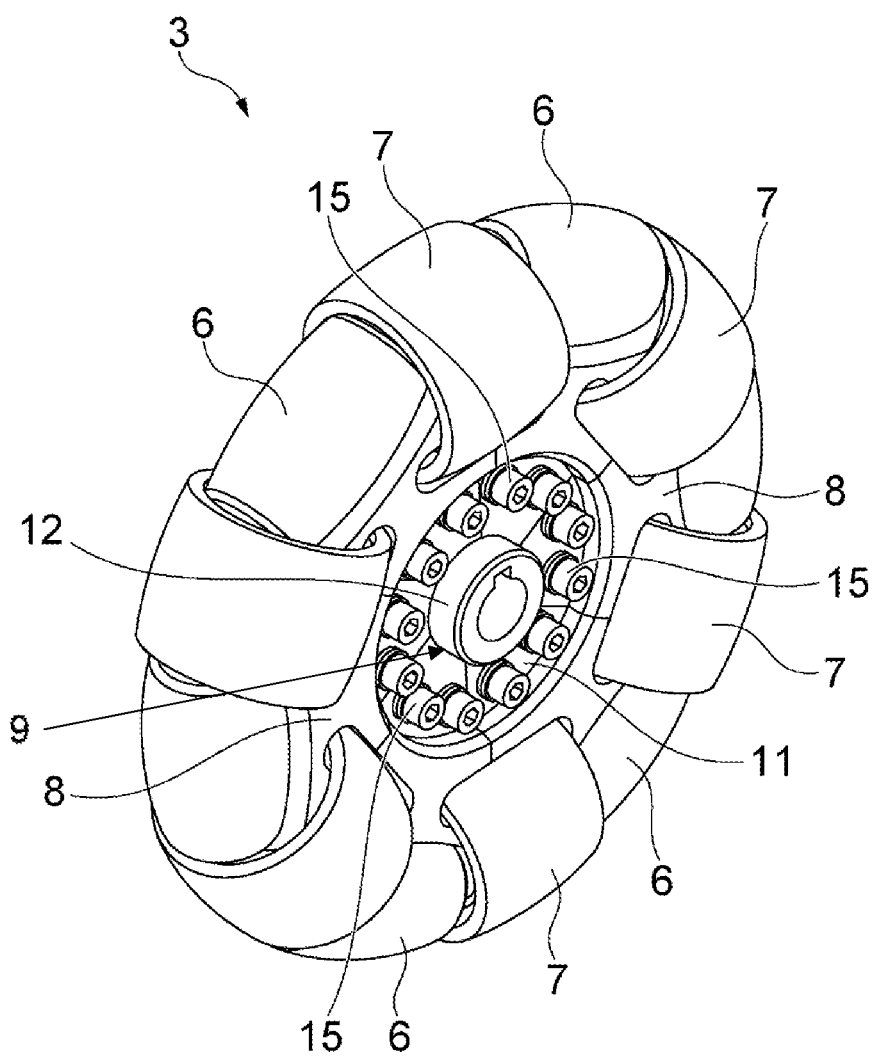
FIG. 2 is a perspective view of an appearance of the omnidirectional wheel according to the embodiment of the present disclosure.
Figure 3:
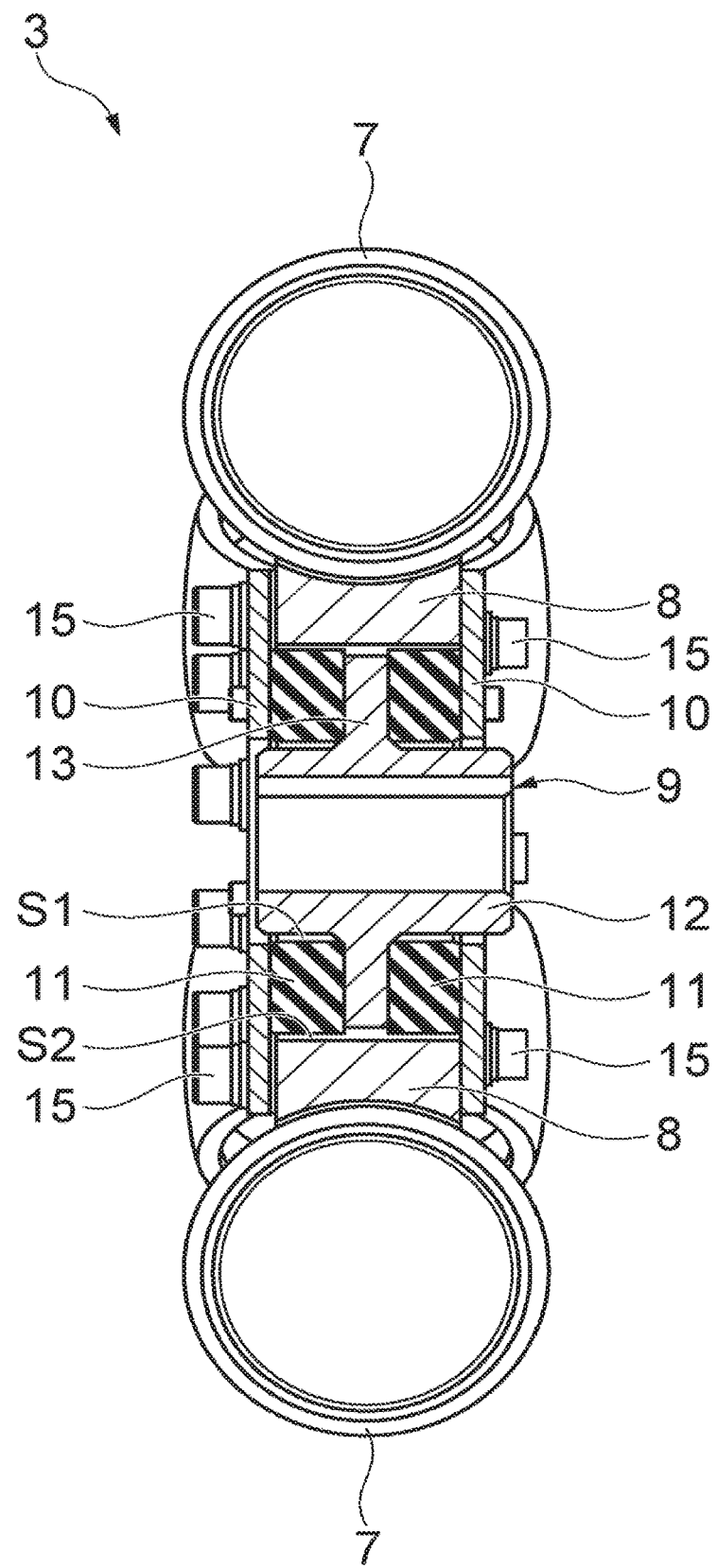
FIG. 3 is a partial sectional view of the omnidirectional wheel according to the embodiment of the present disclosure.

FIG. 2 is a perspective view of an appearance of the omnidirectional wheel 3. FIG. 3 is a partial sectional view of the omnidirectional wheel 3. In FIGS. 2 and 3, the omnidirectional wheel 3 according to the present embodiment includes a plurality of first rollers 6, a plurality of second rollers 7, a plurality of roller support parts 8 free-rotatably supporting the first and second rollers 6 and 7, a wheel hub 9 disposed radially inward from the roller support parts 8, a pair of fixing members 10 disposed on the opposite sides of the wheel hub 9 in an axial direction thereof, and a pair of elastic bodies 11 interposed between the wheel hub 9 and each fixing member 10. The number of the first rollers 6, the second rollers 7, and the roller support parts 8 are respectively six in this embodiment.

The plurality of the first and second rollers 6 and 7 are alternately arranged in an annular shape. The outer diameter of the second rollers 7 is larger than that of the first rollers 6. Each first roller 6 is free-rotatably supported on the roller support part 8 via a shaft and a bearing, and each second roller 7 is free-rotatably supported on two adjacent support parts 8 via another bearing, which is not particularly illustrated.

Figure 4:
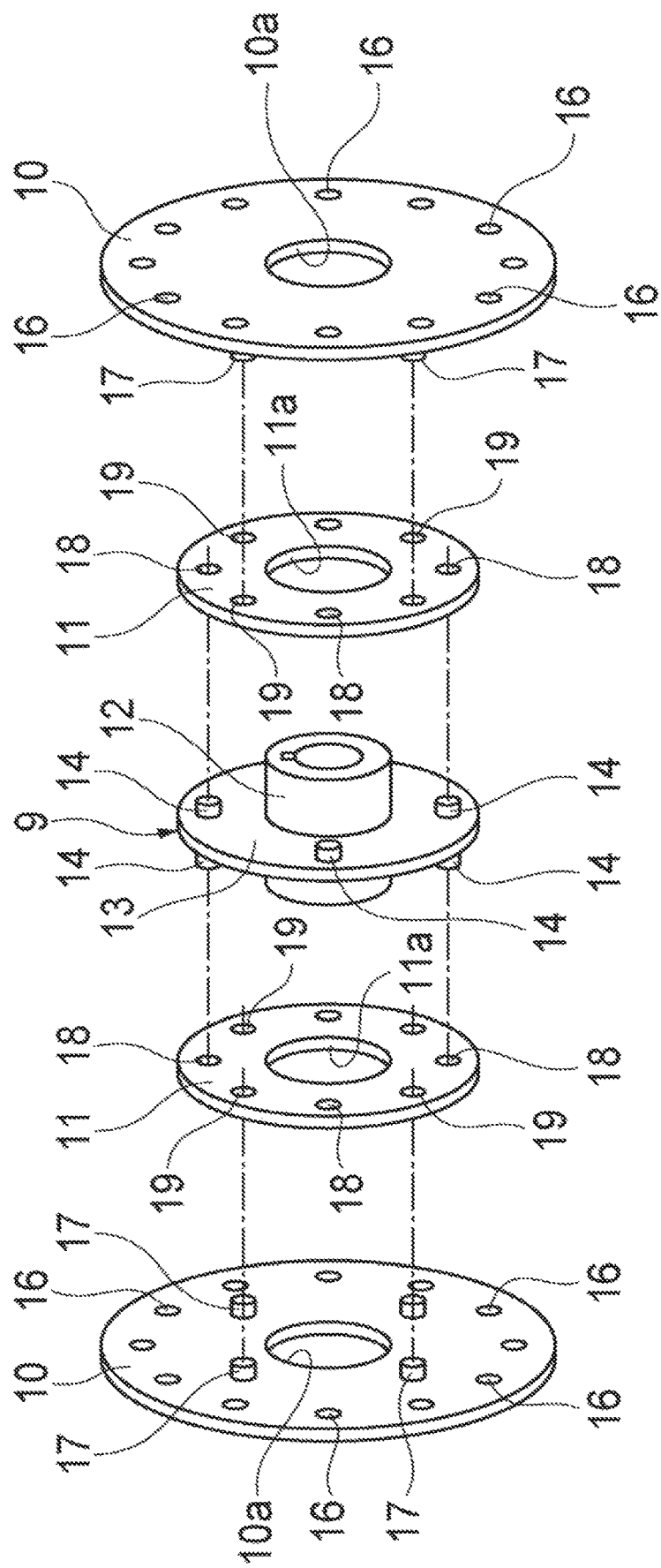
FIG. 4 is an exploded perspective view of a wheel hub, elastic bodies, and fixing members according to the embodiment of the present disclosure.
Figure 5C:
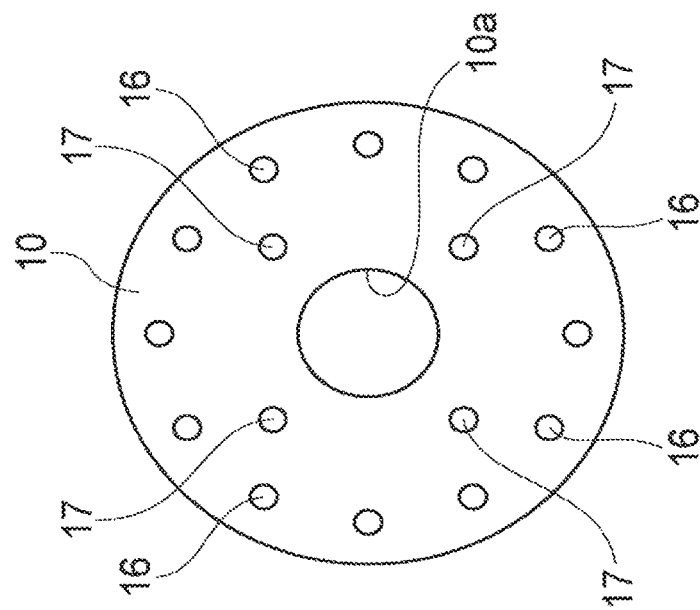
FIG. 5C is a side view of the fixing member according to the embodiment of the present disclosure.
Figure 5B:
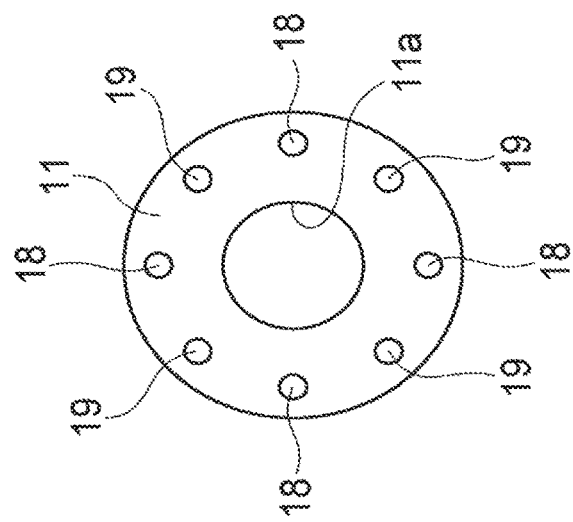
FIG. 5B is a side view of the elastic body according to the embodiment of the present disclosure.
Figure 5A:
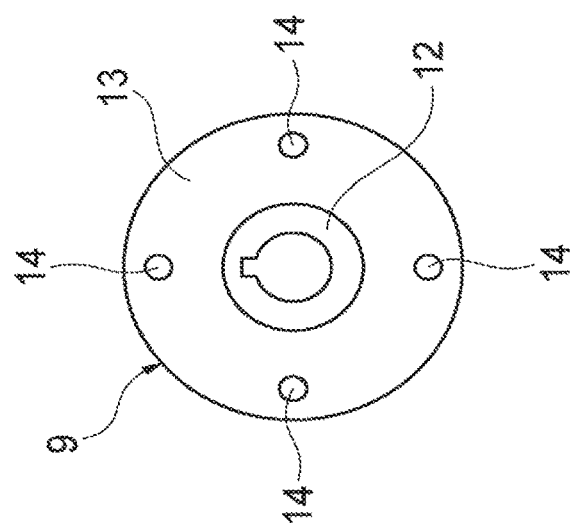
FIG. 5A is a side view of the wheel hub according to the embodiment of the present disclosure.

As shown in FIGS. 4 and 5, the wheel hub 9 has a substantially cylindrical shaft portion 12 and a disc-like extension 13 formed to extend radially outward from the outer circumferential surface of the shaft portion 12. The shaft portion 12 is formed to protrude from the opposite surfaces of the extension 13 in the axial direction of the shaft portion 12. The axle shaft 5 is inserted into the shaft portion 12 and fixed thereto. Accordingly, the shaft portion 12 is connected to the drive motor 4 through the axle shaft 5.

A plurality of columnar pins 14 corresponding to the first pins are formed to protrude from the opposite surfaces of the extension 13. Four pins 14 are disposed on each surface of the extension 13 in this embodiment. The pins 14 are arranged at regular intervals in the circumferential direction of the wheel hub 9.

The fixing members 10 are disposed on the opposite sides of the wheel hub 9 in the axial direction to interpose the extension 13 of the wheel hub 9 between the fixing members 10. The fixing members 10 are disc-like members each having a circular hole 10a through which the shaft portion 12 of the wheel hub 9 passes. The outer diameter of the fixing members 10 is larger than that of the wheel hub 9. Each fixing member 10 is disposed to surround the shaft portion 12. The diameter of the circular holes 10a is larger than the outer diameter of the shaft portion 12.

The fixing members 10 are fastened to side surfaces of the roller support parts 8 with a plurality of bolts 15. Each fixing member 10 has in the vicinity of the edge thereof a plurality of bolt holes 16 through which the thread portions of the bolts 15 pass. These bolt holes 16 are arranged at regular intervals in the circumferential direction of the fixing member 10.

A plurality of columnar pins 17 corresponding to the second pins are formed to protrude from one surface of each fixing member 10. Four pins 17 are disposed in this embodiment. These pins 17 are arranged radially inward than the bolt holes 16 of the fixing member 10. The pins 17 are arranged at regular intervals in the circumferential direction of the fixing member 10. The diameter of the pins 17 is substantially equal to that of the pins 14. In the omnidirectional wheel 3 completely assembled, the pins 17 are disposed on the same circumference as that of the pins 14.

The elastic bodies 11 are disposed on the opposite sides of the wheel hub 9 in the axial direction to interpose the extension 13 of the wheel hub 9 between the elastic bodies 11. The elastic bodies 11 are disc-like members each having a circular hole 11a through which the shaft portion 12 of the wheel hub 9 passes. The outer diameter of the elastic bodies 11 is substantially equal to that of the wheel hub 9. Each elastic body 11 is disposed between the extension 13 and the fixing member 10 to surround the shaft portion 12. The elastic bodies 11 are made of materials such as a rubber and a sponge.

Each elastic body 11 has a plurality of pin holes 18 into which the pins 14 are fitted, and a plurality of pin holes 19 into which the pins 17 are fitted. The pin holes 18 and the pin holes 19 correspond to the first holes and the second holes, respectively. Four pin holes 18 and 19 are respectively disposed in this embodiment. The pin holes 18 and 19 are formed to pass through the elastic body 11 in the axial direction. The pin holes 18 and 19 each have a cross-sectional circular shape. The diameter of the pin holes 18 is substantially equal to that of the pin holes 19.

The pin holes 19 and the pin holes 18 are shifted from each other in the circumferential direction of the elastic body 11. In other word, the pin holes 18 and 19 are not arranged on the same line extending radially outward from the center of the elastic body 11. Specifically, the pin holes 18 and 19 are alternately arranged on the same circumference of the elastic body 11. Each pin hole 19 is interposed intermediately between any two of the adjacent pin holes 18 in the elastic body 11.

The elastic bodies 11 are in contact with the extension 13 of the wheel hub 9 and the fixing members 10. A space S1 is provided between the inner circumferential surface of each elastic body 11 and the outer circumferential surface of the shaft portion 12 of the wheel hub 9. This means that the elastic bodies 11 are not come in contact with the shaft portion 12. A space S2 is provided between the outer circumferential surface of each elastic body 11 and the inner wall of the roller support parts 8. This means that the elastic bodies 11 are not come in contact with the roller support parts 8.

In each of the omnidirectional wheels 3 described above, the wheel hub 9 is rotated by the drive motor 4 through the axle shaft 5, and the torque of the wheel hub 9 is transmitted to the roller support parts 8 through the pins 14, the elastic bodies 11, the pins 17, and the fixing members 10 in this order, resulting in a rotation of the omnidirectional wheel 3.

Here, a load A, which is a reaction force applied to the first rollers 6 and the second rollers 7 that are in contact with the ground (see FIG. 1), is transmitted from the roller support part 8 which is then the nearest to the ground to the elastic bodies 11 through the fixing members 10 and the pins 17. This means that an impact represented by the load A is absorbed by the elastic bodies 11. A load B, which is a part of the weight of the vehicle body 2 applied to each drive motor 4 (see FIG. 1), is transmitted from the axle shaft 5 to the elastic bodies 11 through the wheel hub 9 and each pin 14. This means that an impact represented by the load B is absorbed by the elastic bodies 11.

Generally speaking, the strength of a rubber is larger than that of a sponge. Accordingly, the elastic bodies 11 made of a rubber transmit larger driven torque from the wheel hub 9 to the roller support part 8 than the elastic bodies 11 made of a sponge transmit. A sponge is generally more elastically deformable than a rubber. This means that the elastic bodies 11 made of a sponge absorb a larger impact than the elastic bodies 11 made of a rubber absorb.

In the present embodiment described above, each pin 14 of the wheel hub 9 is fitted into the corresponding pin hole 18 of the elastic bodies 11, and each pin 17 of the fixing members 10 is fitted into the corresponding pin hole 19 of the elastic bodies 11. With this configuration, the load A applied to the first and second rollers 6 and 7 that are in contact with the ground is transmitted to the elastic bodies 11 from the roller support part 8 which is then the nearest to the ground through the fixing members 10 and the pins 17. The load B applied to each drive motor 4 is transmitted to the elastic bodies 11 through the wheel hub 9 and the pins 14. This transmission of the loads means that the impact on the omnidirectional wheels 3 generated while the vehicle unit 1 is traveling is absorbed by the elastic bodies 11. For example, the impact generated when a point of contact with the ground moves from one roller to another roller is absorbed by the elastic bodies 11, that is, the vibration generated during driving the vehicle unit 1 is restricted.

The torque of the wheel hub 9 by the drive motor 4 is transmitted to the roller support parts 8 through the pins 14, the elastic bodies 11, the pins 17, and the fixing members 10 in this order, resulting in the rotation of the omnidirectional wheels 3. This configuration prevents slipping at the contact portions of the elastic bodies 11 with the wheel hub 9 and the roller support parts 8 even when a large torque is applied to the wheel hub 9 or oil enters into the contact portions. As a result, the phase shifts between the elastic bodies 11 and the wheel hub 9, or between the elastic bodies 11 and the roller support parts 8 are prevented, resulting in a reduction of the transmission loss of the driven torque. And, when the traveling of the vehicle unit 1 is controlled with the number of rotations of the omnidirectional wheels 3, the present disclosure improves the vehicle controllability such as stopping accuracy and straight-line stability.

In the present embodiment, the pin holes 19 and the pin holes 18 are shifted from each other in the circumferential direction of the elastic body 11. With this configuration, the size of the elastic bodies 11 in the radial direction of the elastic bodies 11 may be reduced as compared to the elastic bodies 11 having the pin holes 18 and the pin holes 19 shifted from each other in the radial direction of the elastic body 11. As the size of the elastic bodies 11 is reduced in the radial direction, the sizes of the wheel hub 9 and the fixing members 10 may be also reduced in the radial direction. Therefore, the size reduction of the omnidirectional wheels 3 may be achieved.

In the present embodiment, each of the pin holes 19 is interposed intermediately between any two of the adjacent pin holes 18. With this configuration, the load A applied to the first and second rollers 6 and 7 that are in contact with the ground and the load B applied to the drive motor 4 are transmitted to the elastic bodies 11 uniformly, so that the impact on the omnidirectional wheels 3 generated while the vehicle unit 1 is traveling is effectively absorbed by the elastic bodies 11.

In the present embodiment, the number of the pins 14 is equal to the number of the pins 17, and the number of the pin holes 18 is equal to the number of the pin holes 19. With this configuration, the load A applied to the first and second rollers 6 and 7 that are in contact with the ground and the load B applied to the drive motor 4 are transmitted to the elastic bodies 11 uniformly, so that the impact on the omnidirectional wheels 3 generated while the vehicle unit 1 is traveling is more effectively absorbed by the elastic bodies 11.

In the present embodiment, the pin holes 18 and the pin holes 19 are arranged on the same circumference of the elastic body 11, thereby further reducing the size of the elastic bodies 11 in the radial direction. Therefore, the further size reduction of the omnidirectional wheel 3 is achieved.

In the present embodiment, the fixing members 10 and the elastic bodies 11 are respectively disposed on the opposite sides of the wheel hub 9 in the axial direction, and the pins 14 are respectively formed to protrude from the opposite surfaces of the extension 13 of the wheel hub 9 in the axial direction. With this configuration, the omnidirectional wheels 3 have high strength against the load in the axial direction.

The present disclosure is not limited to the above embodiment. For example, in the above embodiment, the number of the pins 14 protruding from the extension 13 of the wheel hub 9 is equal to the number of the pins 17 protruding from the fixing members 10. However, the number of the pins 14 may be different from the number of the pins 17.

In the above embodiment, in the elastic bodies 11, each pin hole 19 is interposed intermediately between any two of the adjacent pin holes 18. However, the pin holes 19 may be arranged in the vicinity of pin holes 18 if the pin holes 19 and the pin hole 18 are shifted from each other in the circumferential direction of the elastic bodies 11.

In the above embodiment, the pin holes 18 and 19 are arranged on the same circumference of the elastic body 11. However, the pin holes 19 and the pin holes 18 may be shifted from each other in the radial direction of the elastic bodies 11 if the pin holes 19 and the pin holes 18 are shifted from each other in the circumferential direction of the elastic bodies 11.

In the above embodiment, the fixing members 10 and the elastic bodies 11 are respectively disposed on the opposite sides in the axial direction of the wheel hub 9. However, the fixing member 10 and the elastic body 11 may be disposed on only one side of the wheel hub 9 in the axial direction. In this case, the shaft portion 12 may be formed to protrude to only one side from the extension 13, and the pins 14 may be formed to protrude from the same one side surface of the extension 13.

In the above embodiment, the vehicle unit 1 includes four omnidirectional wheels 3. However, the present disclosure may also be applicable to a vehicle unit including three omnidirectional wheels 3.

What is claimed is:

1. An omnidirectional wheel rotationally driven by a driving source, the omnidirectional wheel comprising:
   a plurality of first and second rollers arranged in an annular shape;
   a plurality of roller support parts rotatably supporting the first and second rollers;
   a wheel hub disposed radially inward from the roller support parts; and
   a fixing member fastened to the roller support parts, wherein
   the wheel hub has a shaft portion connected to the driving source and an extension formed to extend from an outer circumferential surface of the shaft portion,
   the fixing member is disposed to surround the shaft portion,
   an elastic body is disposed between the extension and the fixing member to surround the shaft portion,
   a first space is provided between the elastic body and the shaft portion,
   a second space is provided between the elastic body and the roller support parts,
   a plurality of first pins are formed to protrude from the extension, a plurality of second pins are formed to protrude from the fixing member, the elastic body has a plurality of first holes into which the first pins are fitted, and a plurality of second holes into which the second pins are fitted, and the first holes and the second holes are shifted from each other in a circumferential direction of the elastic body.

2. The omnidirectional wheel according to claim 1, wherein each of the second holes is interposed intermediately between any two adjacent first holes.

3. The omnidirectional wheel according to claim 1, wherein the number of the first pins is equal to the number of the second pins, and the number of the first holes is equal to the number of the second holes.

4. The omnidirectional wheel according to claim 1, wherein the first holes and the second holes are arranged on the same circumference.

5. The omnidirectional wheel according to claim 1, wherein the fixing member includes a plurality of fixing members, the elastic body includes a plurality of elastic bodies, the fixing members and the elastic bodies are respectively disposed on opposite sides of the wheel hub, and the first pins are respectively formed to protrude from opposite surfaces of the extension.

\* \* \* \* \*